J. E. BUCKLEY.
BROILER PAN.
APPLICATION FILED JUNE 3, 1912.
1,069,107.
Patented Aug. 5, 1913.
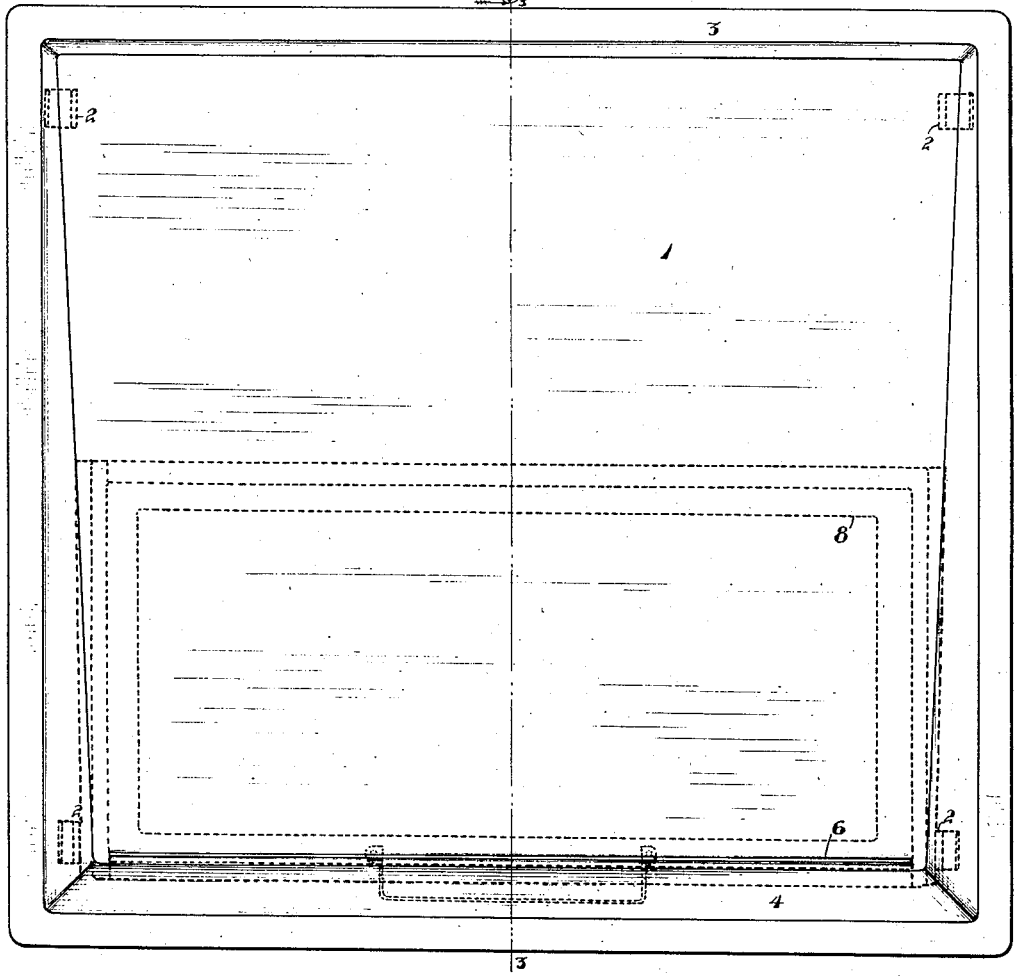
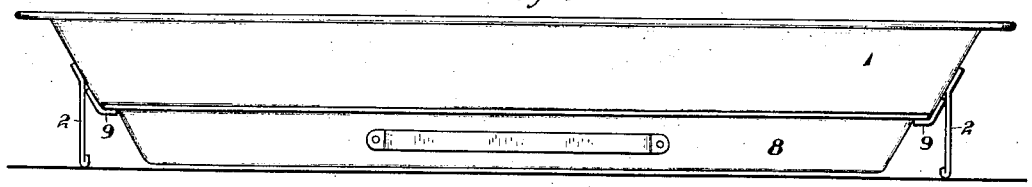
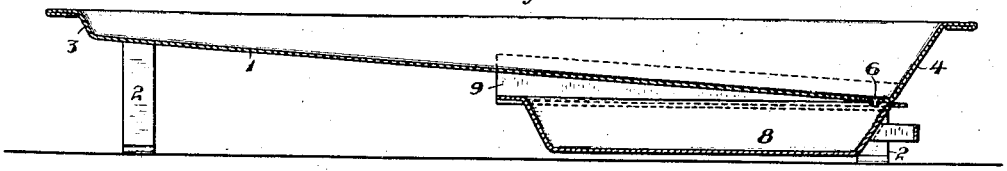
Witnesses:-
Inventor
James E. Buckley
By F. M. Wright
her Attorney

UNITED STATES PATENT OFFICE.

JANE E. BUCKLEY, OF BERKELEY, CALIFORNIA.

BROILER-PAN.

1,069,107. Specification of Letters Patent. Patented Aug. 5, 1913.

Application filed June 3, 1912. Serial No. 701,181.

*To all whom it may concern:*

Be it known that I, JANE ELIZABETH BUCKLEY, a citizen of the United States, residing at Berkeley, in the county of Alameda and State of California, have invented new and useful Improvements in Broiler-Pans, of which the following is a specification.

The object of the present invention is to provide an improved broiler pan for use in gas ovens which will render it impossible for the drippings from the meat being broiled to catch fire from the gas flames.

In the accompanying drawing, Figure 1 is a plan view of my improved broiler pan; Fig. 2 is a front view thereof; Fig. 3 is a vertical section thereof on the line 3—3 of Fig. 1; Fig. 4 is an enlarged vertical section of a detail.

Referring to the drawing, 1 indicates my improved broiler pan, which is rectangular in form and differs in general appearance from ordinary broiler pans, in that it is of greater depth at the front than at the rear. It is supported upon legs 2 of such respective height as to cause the broiler pan to slope from its rear edge 3 to the front edge 4 downwardly at an angle great enough to permit a somewhat rapid flow of the drippings in the pan to the front edge thereof. Parallel with said front edge and closely adjacent thereto, there is formed in the bottom of the pan an extremely narrow slot 6 extending the full length of the bottom of the pan. The sides 7 of this slot are curved downwardly to facilitate the flow of the drippings therethrough, which then drop into a drip pan 8 removably supported by its flanges on supports 9 secured to the broiler pan and extending inwardly beneath its bottom. Said drip pan extends the full length of the broiler pan, but it is of considerably less width, being of sufficient size to hold all the drippings of the meat.

The essence of my invention resides in the construction and dimensions of the slot 6. This slot is formed to operate upon the principle of the safety lamp, that is, is so narrow that no flame can pass through it because the flame is extinguished by the abstraction of heat by the sides of said slot. Even should the drippings in the broiler pan itself catch fire, the flame cannot extend to the drippings in the drip pan. On account of the rapid flow of the drippings down to the slot 6 the quantity of drippings in the broiler pan is at all times small, and consequently there is little probability of their catching fire, and even if they should catch fire the flames are inconsiderable in magnitude. But in any case such flame cannot pass through the narrow slot 6, and the word narrow is intended to define in the claims such a degree of proximity of the sides of the slot, that flame cannot pass therethrough.

I claim:—

1. The combination with a broiler pan having an inclined bottom formed at its lowest portion with a narrow elongated slot having a downwardly extending edge and a drip pan arranged to receive the drippings flowing through said slot.

2. The combination with a broiler pan having an inclined bottom formed at its lowest portion with a narrow elongated slot having a downwardly extending edge said broiler pan being provided with supports for a drip pan to receive the drippings flowing through said slot, and a drip pan movably supported by said supports.

In testimony whereof I have hereunto set my hand in the presence of two subscribing witnesses.

JANE E. BUCKLEY.

Witnesses:
 FRANCIS M. WRIGHT,
 D. B. RICHARDS.